(12) United States Patent
Tsumura et al.

(10) Patent No.: US 12,220,841 B2
(45) Date of Patent: Feb. 11, 2025

(54) PREFORM AND METHOD OF PRODUCING SAME

(71) Applicant: Toray Industries, Inc., Tokyo (JP)

(72) Inventors: Yusuke Tsumura, Nagoya (JP); Yuki Mitsutsuji, Nagoya (JP); Takashi Hasegawa, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 233 days.

(21) Appl. No.: 17/911,877

(22) PCT Filed: Dec. 22, 2020

(86) PCT No.: PCT/JP2020/047904
§ 371 (c)(1),
(2) Date: Sep. 15, 2022

(87) PCT Pub. No.: WO2021/192464
PCT Pub. Date: Sep. 30, 2021

(65) Prior Publication Data
US 2023/0113270 A1    Apr. 13, 2023

(30) Foreign Application Priority Data
Mar. 24, 2020   (JP) ................................ 2020-052611

(51) Int. Cl.
  *B32B 3/26*     (2006.01)
  *B29B 11/16*    (2006.01)
  *B29C 70/20*    (2006.01)

(52) U.S. Cl.
CPC .............. *B29B 11/16* (2013.01); *B29C 70/20* (2013.01); *B32B 3/266* (2013.01)

(58) Field of Classification Search
None
See application file for complete search history.

(56) References Cited

U.S. PATENT DOCUMENTS

| | | | |
|---|---|---|---|
| 4,992,127 A * | 2/1991 | Kishi | ...................... B29B 15/08 |
| | | | 156/182 |
| 2010/0028593 A1 | 2/2010 | Taketa et al. | |

(Continued)

FOREIGN PATENT DOCUMENTS

| | | |
|---|---|---|
| JP | 2008-260793 A | 10/2008 |
| JP | 2010-030193 A | 2/2010 |

(Continued)

OTHER PUBLICATIONS

International Search Report dated Mar. 16, 2021 in counterpart International Application No. PCT/JP2020/047904.

(Continued)

*Primary Examiner* — Alexander S Thomas
(74) *Attorney, Agent, or Firm* — DLA Piper LLP (US)

(57) ABSTRACT

A preform is obtained by stacking two or more prepreg cut materials, each of which is obtained by cutting a sheet-like prepreg into an outline of a predetermined shape, and the sheet-like prepreg being formed of a matrix resin and reinforcing fibers aligned in one direction. This preform is characterized in that at least one prepreg cut material has first incisions that are regularly distributed throughout the whole in-plane region and a second incision that is longer than the first incision while being provided only in a predetermined specific region.

20 Claims, 14 Drawing Sheets

(56) References Cited

U.S. PATENT DOCUMENTS

| | | |
|---|---|---|
| 2010/0247838 A1 | 9/2010 | Burpo et al. |
| 2019/0077048 A1 | 3/2019 | Fujita et al. |
| 2020/0001550 A1 | 1/2020 | Fujita et al. |

FOREIGN PATENT DOCUMENTS

| | | |
|---|---|---|
| JP | 5272418 B2 | 8/2013 |
| JP | 2014-172267 A | 9/2014 |
| JP | 2015-143343 A | 8/2015 |
| JP | 5950149 B2 | 7/2016 |
| TW | 201114585 A | 5/2011 |
| TW | 201831573 A | 9/2018 |
| WO | 2008/099670 A1 | 8/2008 |
| WO | 2017/159567 A1 | 9/2017 |

OTHER PUBLICATIONS

Written Opinion dated Mar. 16, 2021 in counterpart International Application No. PCT/JP2020/047904.
Office Action darted Jul. 9, 2024, of counterpart Taiwanese Patent Application No. 110109693, along with an English machine translation.

\* cited by examiner

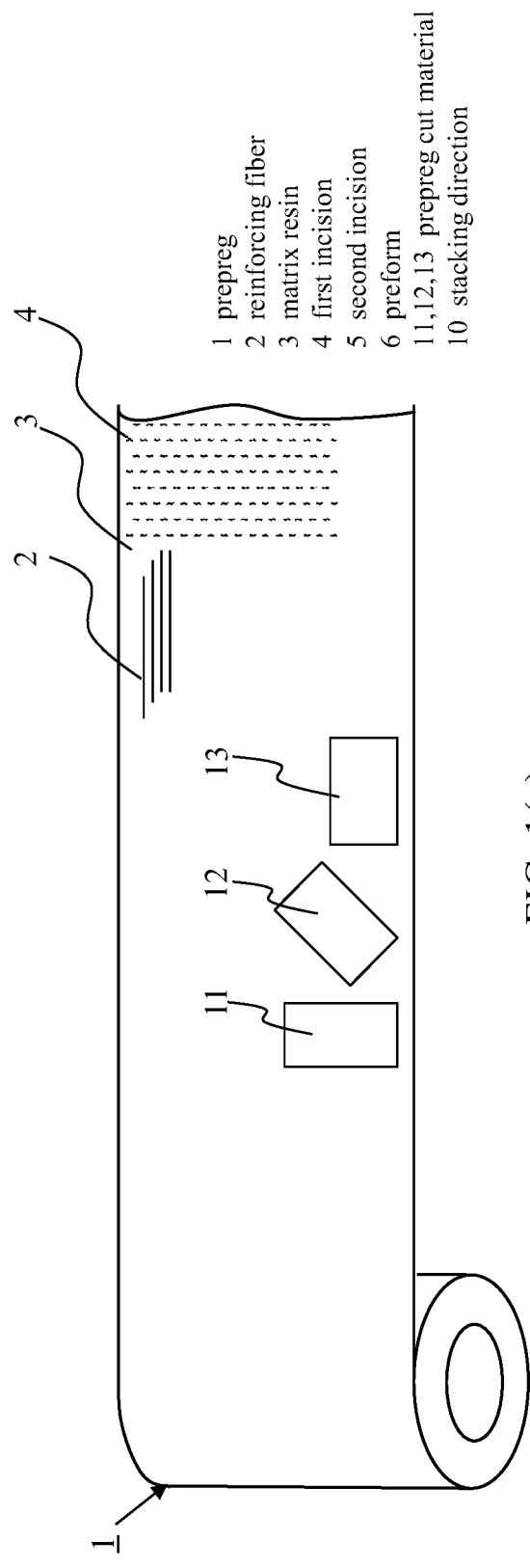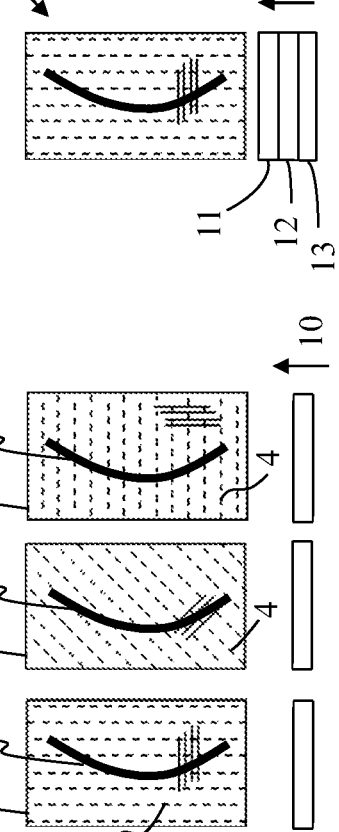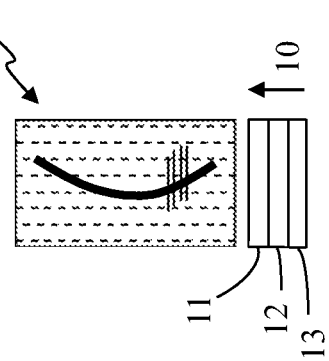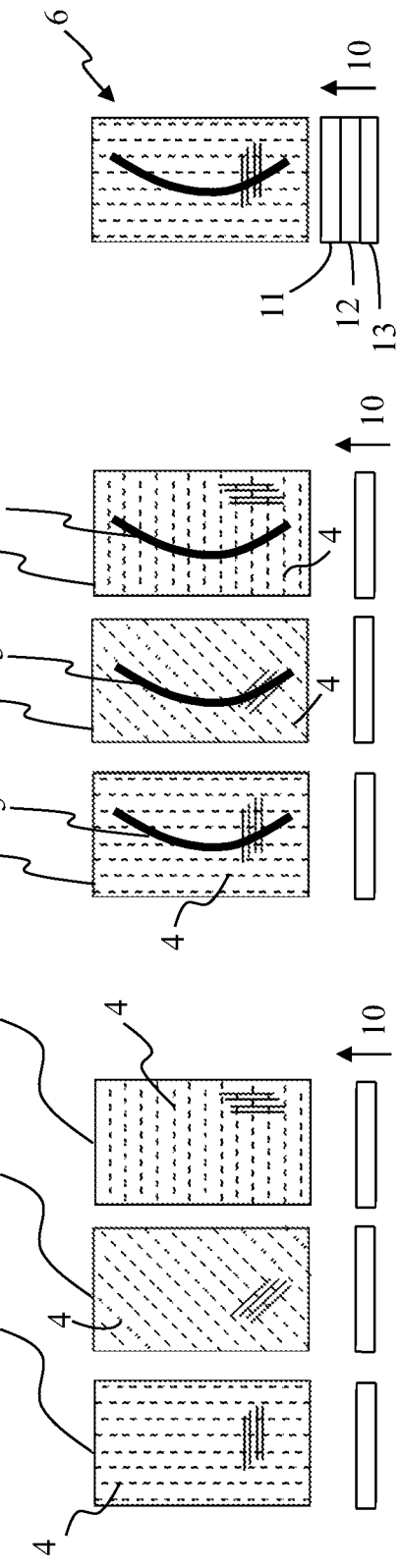

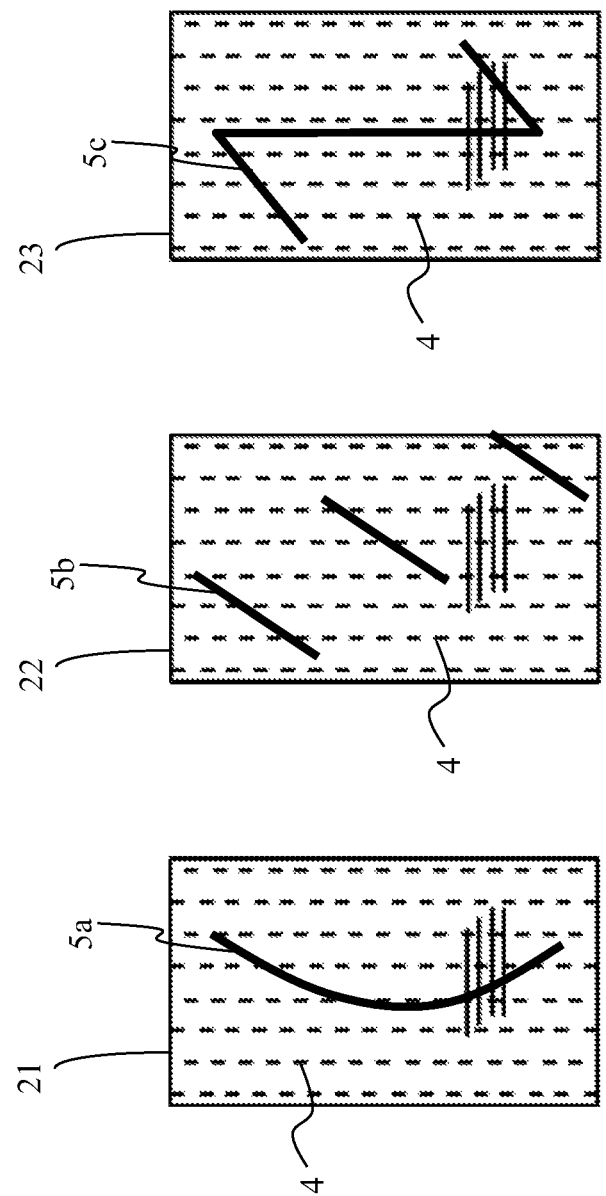

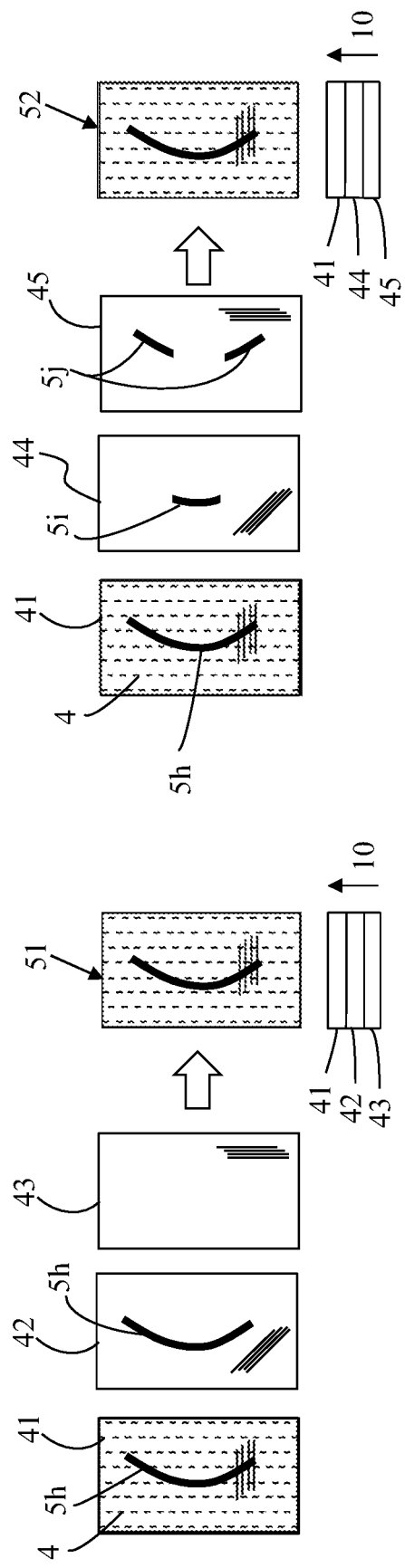
FIG. 4(a)
FIG. 4(b)
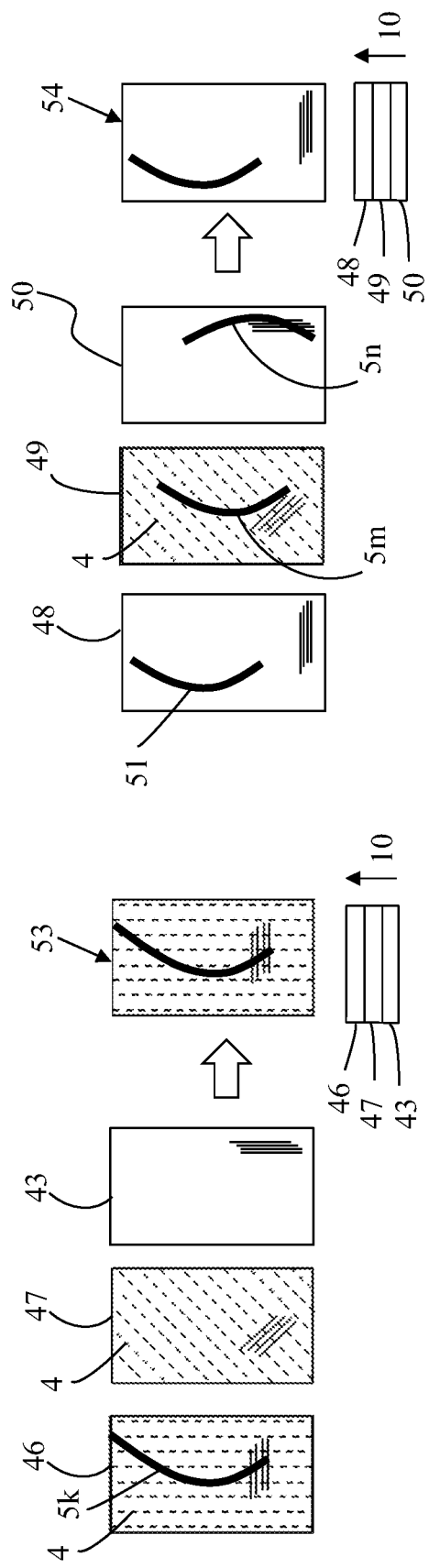
FIG. 4(c)
FIG. 4(d)

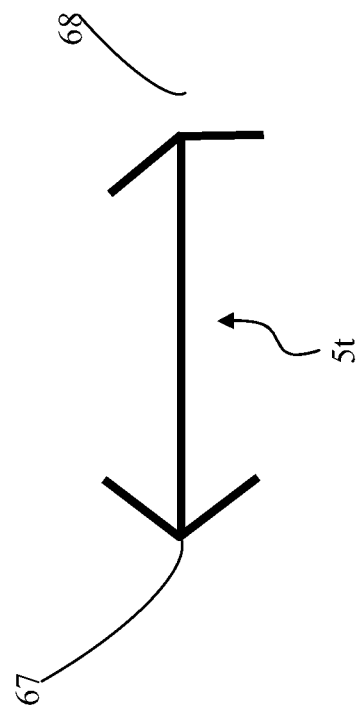
FIG. 6(b) more than 180 degrees
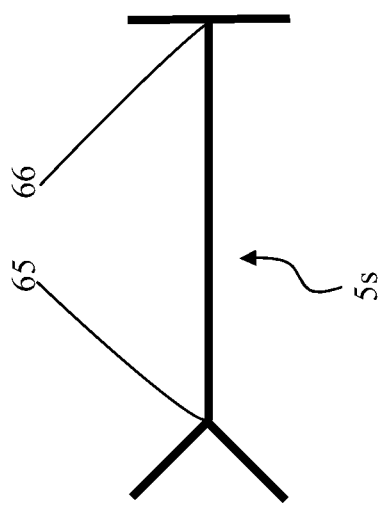
FIG. 6(a) 180 degrees or less

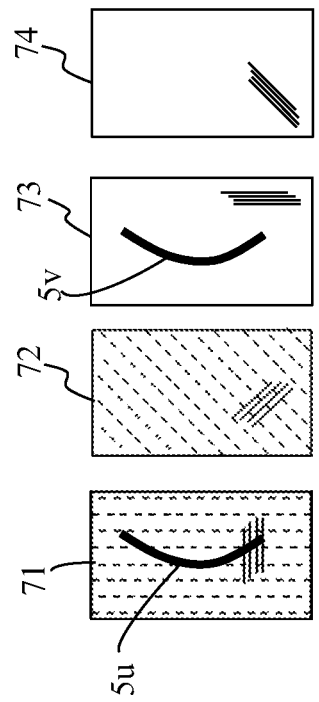
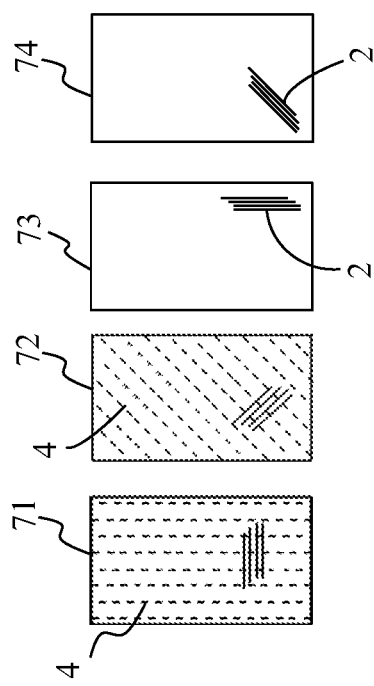
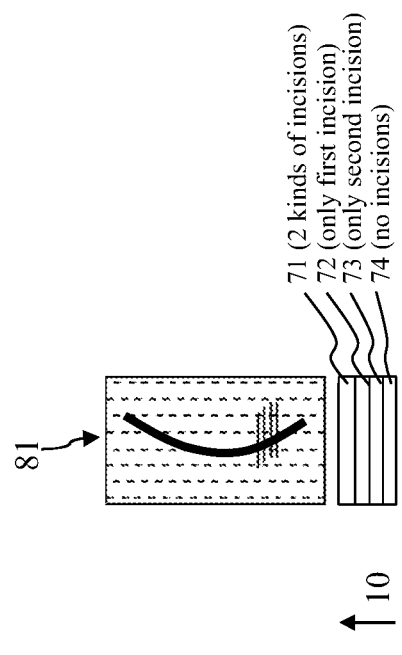
FIG. 7(a)
FIG. 7(b)
FIG. 7(c)

FIG.14
hatching part : plane reached up to wall surface (completely filled)
non-pattern part : plane not reached up to wall surface (not filled)
dotted part : resin rich
rib 1
Comparative Example 2-1
Example 2-1
Example 2-2
Example 2-3
rib 2
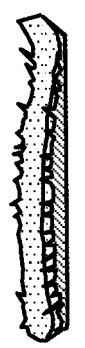
Comparative Example 2-1
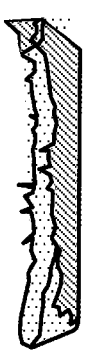
Example 2-1
Example 2-2
Example 2-3

PREFORM AND METHOD OF PRODUCING SAME

TECHNICAL FIELD

This disclosure relates to a preform suitable for use when it is required to efficiently produce a fiber-reinforced resin molded article having a complicated shape or a thickness change, and a method of producing the same.

BACKGROUND

Since a fiber-reinforced resin is lightweight, high-strength and highly rigid, it is used in a wide range of fields such as sports/leisure applications such as fishing rods and golf shafts, and industrial applications such as automobiles and aircraft. For the production of the fiber-reinforced resin, a method using a prepreg, which is an intermediate material in which a resin is impregnated into a fiber reinforcing material made of long fibers such as reinforcing fibers, is preferably used. A molded article comprising a fiber-reinforced resin can be obtained by cutting a prepreg into a desired shape, stacking it to form a preform, and heat-curing it in a mold (for example, JP-A-2015-143343).

Further, it is preferred to mold with a material having a good fill ability at a place where a thickness change occurs, and it is also carried out that a sheet molding compound (SMC) is placed only in a part of a complicated shape such as a rib, and a shape with a rib is obtained by press molding (for example, JP-B-5950149).

Furthermore, to achieve uniform mechanical properties and excellent dimensional stability of a molded article, a technology using a prepreg provided with incisions at a regular distribution throughout the whole in-plane region or a preform stacked with the prepregs is known (for example, JP-B-5272418).

However, in the press molding of a product shape having a thickness change, especially a product shape having a thin wall portion surrounded by a thick wall portion, when a conventional preform, which is prepared by stacking a plurality of prepreg cut materials each having an identical shape and an outer peripheral outline of the product shape, is used, while the productivity is excellent, there are possibilities from a mismatch between the preform shape and the product shape that the product shape is not followed due to the occurrence of a stretching of reinforcing fibers or the like at the thickness change part or the corner part, and that a target product shape cannot be molded because a mold cannot be closed completely. In such a situation, because a part of the preform is locally pressurized in the thin wall portion and the entire preform is not sufficiently pressurized, there is a problem that molding defects such as resin-rich part, uneven thickness and voids occur, and the mechanical properties and design property as the molded article may deteriorate.

On the other hand, in a similar press molding, when a conventional preform, which partially uses a cut material having an opening or a notch at a position corresponding to the thin wall portion of the product shape, is used, because a part corresponding to the opening part of the prepreg cut material is discarded as an unnecessary part, there is a problem that the material yield decreases. Moreover, because the area of the prepreg cut material is reduced by the opening or notch, it is necessary to increase the number of stacked pieces to produce the preform with a predetermined weight, the cutting time and the stacking time increase, and therefore, there is a problem that a lot of time and cost are required for the production of the preform.

Further, differently from the above-described problems, in a similar press molding, when a conventional preform, in which an isotropic short fiber reinforced resin material excellent in fluidity such as an SMC is disposed only in a part having a thickness change, particularly a thick wall portion, is used, there are possibilities that a resin shrinkage during molding occurs due to a difference in fiber content between the prepreg and the short fiber reinforced resin material, thereby causing warping in the product, and that because the mechanical properties of short fiber reinforced resin are essentially inferior to those of the prepreg, it is difficult to obtain satisfactory mechanical properties.

Furthermore, when prepregs each having incisions regularly distributed throughout the whole in-plane region are simply stacked and used as described in JP '418 when a thickness change or a complicated three-dimensional shape is not accompanied, it is possible to obtain uniform mechanical properties and excellent dimensional stability of a molded article, but when a thickness change or a complicated three-dimensional shape is accompanied, because the process conditions capable of achieving a molding are limited and there is a possibility reducing the production efficiency, it is difficult to obtain a desired molded article while achieving both good production efficiency and mechanical properties.

Thus, in the above-described conventional technologies, it is extremely difficult to obtain a molded article having a thickness change while achieving both production efficiency and mechanical properties, even if materials having different moldability are used in combination.

Accordingly, it could be helpful to provide a preform excellent in material yield, production efficiency, mechanical properties and fill ability to a cavity and effective for avoiding problems such as occurrence of bridging of fibers, resin-rich part and warping, even when a product shape having a thickness change is obtained by press molding, and a method of producing the same.

SUMMARY

We thus provide:
(1) A preform prepared by stacking two or more prepreg cut materials each of which is made by cutting a sheet-like prepreg into an outline of a predetermined shape, the sheet-like prepreg comprising reinforcing fibers aligned in one direction and a matrix resin, characterized in that at least one prepreg cut material has first incisions that are regularly distributed throughout the whole in-plane region and a second incision that is provided only in a predetermined specific region and longer than the first incision.
(2) The preform according to (1), wherein the number of the second incisions in the at least one prepreg cut material is 1/20 or less of the number of the first incisions.
(3) The preform according to (1) or (2), wherein the second incision extends, as a whole, along the outline of the at least one prepreg cut material.
(4) The preform according to any of (1) to (3), wherein the preform comprises a preform a prepreg cut material having the first incisions and the second incision and at least one prepreg cut material selected from (A) to (C):
 (A) prepreg cut material having only the first incisions
 (B) prepreg cut material having only the second incision
 (C) prepreg cut material having no incisions.

(5) The preform according to any of (1) to (4), wherein the second incision does not reach up to the outline of the at least one prepreg cut material.
(6) The preform according to any of (1) to (5), wherein a plurality of prepreg cut materials each having the second incision are provided, and the total depth of the second incisions of the plurality of prepreg cut materials is 50% or more of the thickness of the preform.
(7) The preform according to any of (1) to (6), wherein the second incision penetrates through the preform.
(8) The preform according to any of (1) to (7), wherein the second incision has at least one divergent point.
(9) The preform according to (8), wherein any of divergent angles at the divergent point of the second incision is 180 degrees or less.
(10) The preform according to any of (1) to (9), wherein the at least one prepreg cut material has a three-dimensional shape portion protruding in an out-of-plane direction.
(11) The preform according to any of (1) to (10), wherein the preform is a preform used for molding a molded article having a thin wall portion and a thick wall portion.
(12) The preform according to (11), wherein the second incision is provided at least in a region of the preform corresponding to the thin wall portion of the molded article.
(13) The preform according to (11) or (12), wherein the second incision is provided at least in a region of the preform corresponding to a boundary between the thin wall portion and the thick wall portion of the molded article.
(14) The preform according to any of (11) to (13), wherein the second incision is provided at least in a region of the preform corresponding to the thick wall portion of the molded article.
(15) The preform according to any of (11) to (14), wherein the second incision extends along a direction in which the thick wall portion extends.
(16) The preform according to any of (11) to (15), wherein a length L2 of the second incision satisfies equation (a):

$$L2 \geq 2t/\cos\theta \quad (a)$$

wherein t: height of the thick wall portion, θ: angle formed between a principal axis direction of the thick wall portion and a fiber direction of a surface layer of the preform.
(17) The preform according to (15), wherein a length L2 of the second incision is equal to a length in a principal axis direction of the thick wall portion or more.
(18) The preform according to any of (11) to (17), wherein an angle formed between the second incision and a fiber direction of a surface layer of the preform forming the thick wall portion is in a range of 90 degrees±15 degrees.
(19) A method of producing a preform comprising the following steps of:
  (a) a step of forming a plurality of prepreg cut materials each of which is made by cutting a sheet-like prepreg into an outline of a predetermined shape, the sheet-like prepreg comprising reinforcing fibers aligned in one direction and a matrix resin,
  (b) a step of stacking the plurality of prepreg cut materials in a form of a preform, and
  (c) a step of providing, to at least one prepreg cut material among the plurality of prepreg cut materials, in addition to first incisions that have been regularly provided throughout the whole in-plane region, a second incision that is longer than the first incision only in a predetermined specific region,
  wherein the step (c) is carried out between the step (a) and the step (b) or before the step (a).
(20) A method of producing a preform comprising the following steps of:
  (a) a step of forming a plurality of prepreg cut materials each of which is made by cutting a sheet-like prepreg into an outline of a predetermined shape, the sheet-like prepreg comprising reinforcing fibers aligned in one direction and a matrix resin,
  (b) a step of stacking the plurality of prepreg cut materials in a form of a preform, and
  (c) a step of providing, to at least one prepreg cut material among the plurality of prepreg cut materials, in addition to first incisions that have been regularly provided throughout the whole in-plane region, a second incision that is longer than the first incision only in a predetermined specific region,
  wherein the step (c) is carried out after the step (b).
(21) The method of producing a preform according to (19) or (20), wherein a preform to be produced comprises, in addition to the prepreg cut material having the first incisions and the second incision, at least one prepreg cut material selected from (A) to (C):
  (A) a prepreg cut material having only the first incisions
  (B) a prepreg cut material having only the second incision
  (C) a prepreg cut material having no incisions.

In our preform and the method of producing the same, using the preform, especially when a fiber-reinforced resin molded article with a product shape having a thickness change is obtained by press molding, a molded article having excellent mechanical properties with a high fill ability of a molding material into a cavity can be obtained with excellent material yield and production efficiency, and in molding, especially in a molding accompanied with a thickness change or a complicated three-dimensional shape, the problem of the occurrence of bridging of fibers, a resin-rich part or warping can be easily avoided.

BRIEF DESCRIPTION OF THE DRAWINGS

FIGS. 1(a)-1(d) show schematic diagrams showing an example of a prepreg and prepreg cut materials and a preform.
FIGS. 2(a)-2(c) show schematic plan views of prepreg cut materials each illustrating an example of a relationship between a first incision and a second incision provided in a prepreg cut material.
FIGS. 4(a)-4(d) show schematic diagrams each illustrating an example of prepreg cut materials and an example of a preform stacked with them.
FIGS. 6(a)-6(b) show schematic plan views of second incisions one of which illustrates an example of when a divergent angle of a second incision having a divergent point is 180 degrees or less and the other of which illustrates an example when the divergent angle is more than 180 degrees.

FIGS. 7(a)-7(c) are schematic process diagrams showing an example of a timing at which a second incision is provided and an example of stacking into a preform.

FIG. 14 shows schematic partial perspective views each illustrating a degree of achieving filling into rib 1 or 2.

EXPLANATION OF SYMBOLS

Figure 3A:
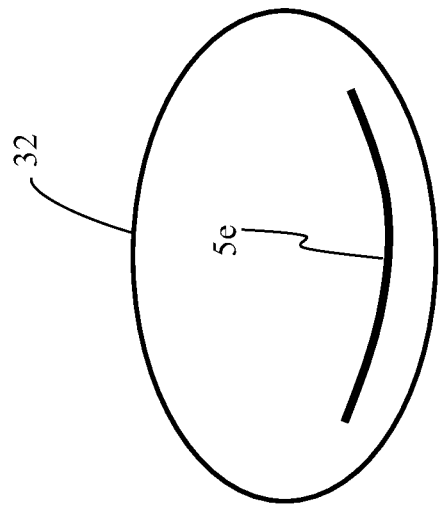
FIGS. 3(a)-3(d) show schematic plan views of prepreg cut materials each illustrating an example in that a second incision extends along an outline of a prepreg cut material.

1: prepreg
2: reinforcing fiber
3: matrix resin
4: first incision
5, 5a, 5b, 5c, 5d, 5e, 5f, 5g, 5h, 5i, 5j, 5k, 5l, 5m, 5n, 5o, 5p, 5q, 5r, 5s, St, 5u, 5v, 5w, 5x: second incision
6, 51, 52, 53, 54, 81, 83: preform
10: stacking direction
11, 12, 13, 21, 22, 23, 31, 32, 33, 34, 41, 42, 43, 44, 45, 46, 47, 48, 49, 50, 71, 72, 73, 74: prepreg cut material
61, 62, 63, 64, 65, 66, 67: divergent point
82: precursor of preform
101, 201: molded article
102, 202: thin wall portion
103: thick wall portion
104: inner circumference of thick wall portion
105: outer circumference of thick wall portion
106, 107, 108, 109, 207, 208, 209, 210: prepreg cut material
203: rib 1
204: rib 2
205: boundary between thick wall portion and thin wall portion
206: second incision

DETAILED DESCRIPTION

Hereinafter, our preforms and methods will be explained together with examples referring to figures.

Our preforms are prepared by stacking two or more prepreg cut materials each of which is made by cutting a sheet-like prepreg into an outline of a predetermined shape, the sheet-like prepreg comprising reinforcing fibers aligned in one direction and a matrix resin, and is characterized in that at least one prepreg cut material has first incisions that are regularly distributed throughout the whole in-plane region and a second incision that is provided only in a predetermined specific region and longer than the first incision.

As the reinforcing fibers used in the prepreg, for example, exemplified are organic fibers such as aramid fibers, polyethylene fibers and polyparaphenylene benzoxadol (PBO) fibers, inorganic fibers such as glass fibers, carbon fibers, silicon carbide fibers, alumina fibers, tyranno fibers, basalt fibers and ceramic fibers, metal fibers such as stainless steel fibers and steel fibers, as others, reinforcing fibers using boron fibers, natural fibers or modified natural fibers or the like as fibers or the like. Among them, in particular, because carbon fibers are lightweight among these reinforcing fibers, and have particularly excellent properties in specific strength and specific elastic modulus, and are also excellent in heat resistance and chemical resistance, they are suitable for members such as automobile panels for which are desired to be made lightweight. In particular, PAN-based carbon fibers, which make it easy to obtain high-strength carbon fibers, are preferred.

As the matrix resin used in the prepreg, for example, exemplified are a thermosetting resin such as epoxy resin, unsaturated polyester resin, vinyl ester resin, phenol resin, epoxy acrylate resin, urethane acrylate resin, phenoxy resin, alkyd resin, urethane resin, maleimide resin or cyanate resin, and a thermoplastic resin such as polyamide, polyacetal, polyacrylate, polysulfone, ABS, polyester, acrylic, polybutylene terephthalate (PBT), polyethylene terephthalate (PET), polyethylene, polypropylene, polyphenylene sulfide (PPS), polyether ether ketone (PEEK), a liquid crystal polymer, vinyl chloride, a fluoro-based resin such as polytetrafluoroethylene, or silicone. Among them, it is particularly preferable to use a thermosetting resin. Since the prepreg has a tackiness at a room temperature by the condition where the matrix resin is a thermosetting resin, when the prepreg cut materials are stacked, the upper and lower cut materials are integrated by adhesion, and the stacked body can be molded while being maintained with an intended structure.

FIG. 1 shows an example of a prepreg and a prepreg cut material, and an example of a preform. In FIG. 1(a), symbol 1 indicates a sheet-like prepreg comprising reinforcing fibers 2, which are aligned in one direction and extending continuously, and a matrix resin 3. In this prepreg 1, first incisions 4 which are regularly distributed throughout the whole in-plane region are provided, and the continuous reinforcing fibers 2 are cut by the first incisions 4 at the site where the first incisions 4 are present. Such regularly distributed first incisions 4 can be provided, for example, by the method described in the aforementioned JP '418. From this prepreg 1, for example, a plurality of prepreg cut materials 11, 12 and 13 having different cutting directions are cut into outlines having a predetermined shape. Each of the cut prepreg cut materials 11, 12 and 13 has the first incisions 4 distributed regularly throughout the whole in-plane region, as shown in FIG. 1(b). Symbol 10 indicates a stacking direction of the prepreg cut materials to the preform (the thickness direction of the prepreg cut material or the preform).

In at least one of the above-described prepreg cut materials 11, 12 and 13, in this example, in each of the prepreg cut materials 11, 12 and 13 as shown in FIG. 1(c), in addition to the first incisions 4 regularly distributed throughout the whole in-plane region, a second incision 5 longer than the first incision 4, which is curved in a bow shape extending along the outline of each of prepreg cut materials 11, 12 and 13, is provided only in a predetermined specific region. The prepreg cut materials 11, 12 and 13 thus formed are stacked as shown in FIG. 1(d) to form a preform 6.

At least one prepreg cut material among the prepreg cut materials stacked to the preform has the first incisions 4 which is distributed regularly throughout the whole in-plane region and the second incision 5 that is provided only in the predetermined specific region and longer than the first incision 4, but for this second incision 5, various forms (a form including a planar shape of an incision, a depth of an incision and the like) can be employed depending on the preform to be molded into a fiber-reinforced resin molded article (the product shape of a fiber-reinforced resin molded article to be molded). For example, with respect to the planar shape of the second incision 5, as shown in FIG. 2 which exemplifies the relationship between the first incisions 4 and the second incision provided in the prepreg cut materials 21, 22 and 23, it can be formed into the bow shape of a second incision 5a similar to that shown in FIG. 1 (FIG. 2(a)), a plurality of separated second incisions 5b (FIG. 2(b)), the hook-shaped bent second incision 5c (FIG. 2(c)) and the like. When a plurality of second incisions are provided in at least one prepreg cut material, the number of the second incisions is preferably 1/20 or less of the number of the first incisions.

As described above, in at least one prepreg cut material among the prepreg cut materials stacked to the preform, the first incisions distributed regularly throughout the whole in-plane region and the second incision which is provided only in the predetermined specific region and which is longer than the first incision are provided, and the first incisions mainly can contribute to reduce the variation in mechanical properties of at least one prepreg cut material as a whole when molded into a molded article, and to improve the dimensional accuracy of the molded article by improving the followability to a shape of a mold, and the second incision can contribute, especially when a fiber-reinforced resin molded article with a product shape having a thickness change is obtained by press molding, to promote smooth flow of both reinforcing fibers and bundles of reinforcing fibers cut by the second incision and the matrix resin existing around them to improve the material yield and production efficiency when making a molded article as a whole of the preform, and to realize a high fill ability into a cavity of a mold to obtain a molded article having further excellent mechanical properties. Further, the presence of the second incision with an appropriate form makes it possible to avoid bridging and tensioning of reinforcing fibers at a corner portion and the like during molding, and to avoid the occurrence of a resin-rich part and warping.

When it is considered that it is effective to provide an appropriate form of second incision, the following various structures can be employed.

Figure 3B:
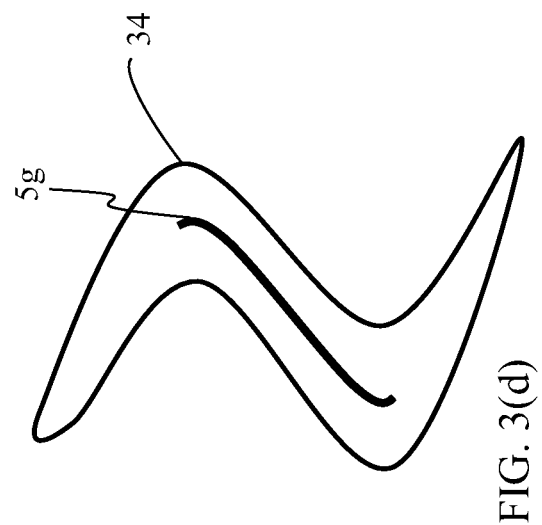
Figure 3C:
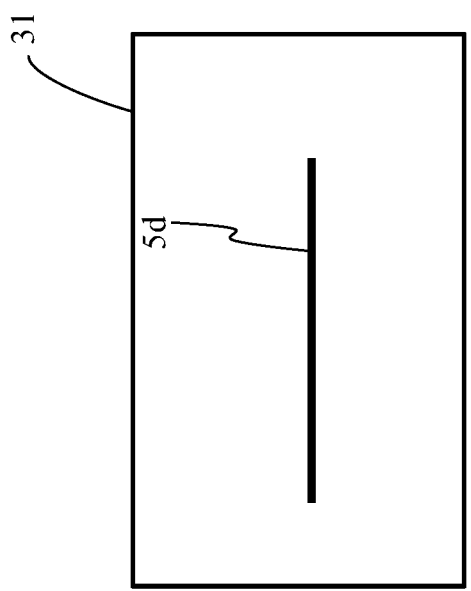
Figure 3D:
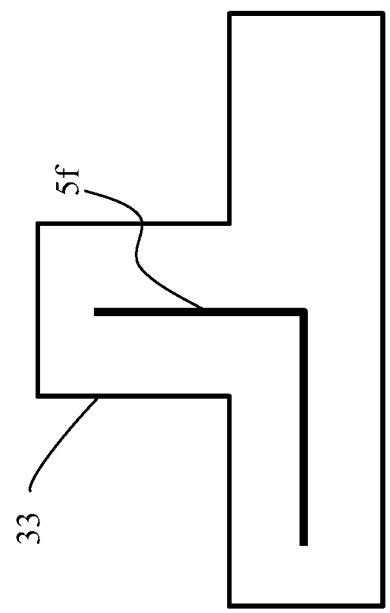

For example, when it is considered effective that the second incision extends along the outline of at least one prepreg cut material as a whole, as shown in FIG. 3 (illustration of the first incisions is omitted), exemplified are a second incision 5d extending linearly along the side of a prepreg cut material 31 having a rectangular planar shape (FIG. 3(a)), a second incision 5e extending curvedly along the arc of a prepreg cut material 32 having an elliptical planar shape (FIG. 3(b)), a second incision 5f extending in an L shape along a part of the outline of a prepreg cut material 33 having a T-shaped planar shape (FIG. 3(c)), a second incision 5g extending in a waveform along a part of the outline of a prepreg cut material 34 having a wavy planar shape (FIG. 3(d)) and the like.

Thus, although the second incision can take various shapes and forms so that the second incision itself does not become a starting point of a cause of a decrease in strength when the preform is made to a molded article, it is preferred that the second incision does not reach up to the outline of the above-described at least one prepreg cut material.

Further, although the depth of the second incision is not particularly limited, for one prepreg cut material, it may be either a form extending up to a halfway of the thickness of the prepreg cut material or a form penetrating through the prepreg cut material. In the form penetrating through the prepreg cut material, it is preferred that the second incision does not reach up to the outline of the prepreg cut material. Further, as described later, since the second incision can be provided even after a plurality of prepreg cut materials are stacked to make a form of a preform, particularly in that instance, it is preferred that the second incision is 50% or more of the thickness of the preform to achieve an excellent material yield and a high fill ability of the molding material into a cavity. The second incision may penetrate the preform. When the second incision penetrates the preform, it is preferred that the second incision does not reach the outline of the prepreg cut material in the preform.

Further, our preforms are effective particularly when a product shape having a thickness change or a complicated three-dimensional shape is obtained by press molding, and in that instance, at least one prepreg cut material having first incisions and a second incision can be made as a form having a three-dimensional shape portion protruding in the out-of-plane direction, except the planar forms as shown in FIG. 3.

Further, with respect to the plurality of prepreg cut materials stacked to the preform, although it is necessary that at least one of the plurality of prepreg cut materials has at least two types of incisions of the first incisions and the second incision, each prepreg cut material to be stacked can take various forms to realize an appropriate form as a whole of the preform. For example, the preform may have a form having at least one prepreg cut material selected from (A) to (C) in addition to the prepreg cut material having first incisions and second incision:

(A) a prepreg cut material having only the first incisions
(B) a prepreg cut material having only the second incision
(C) a prepreg cut material having no incisions.

To more concretely exemplify the stacking form of the preform, for example, as shown in FIG. 4(a), can be exemplified a preform 51 in which a prepreg cut material 41 having first incisions 4 and a second incision 5h, a prepreg cut material 42 having only a second incision 5h, and a prepreg cut material 43 having no incisions, are stacked in a form stacked with the prepreg cut material 41 as an upper layer.

Further, as shown in FIG. 4(b), a preform 52, in which the prepreg cut material 41 having the same first incisions 4 and second incision 5h as those shown in FIG. 4(a), a prepreg cut material 44 having only a second incision 5i with a shape different from that shown in FIG. 4(a), and a prepreg cut material 45 having only a plurality of second incisions 5j with another shape, are stacked in a form stacked with the prepreg cut material 41 as an upper layer, can be exemplified.

Further, as shown in FIG. 4(c), a preform 53, in which a prepreg cut material 46 having first incisions 4 and a second incision 5k, a prepreg cut material 47 having only first incisions 4, and a prepreg cut material 43 having no incisions, are stacked in a form stacked with the prepreg cut material 46 as an upper layer, can be exemplified.

Furthermore, as shown in FIG. 4(d), a preform 54, in which a prepreg cut material 48 having only a second incision 5l, a prepreg cut material 49 having the first incisions 4 and a second incision 5m, and a prepreg cut material 50 having only a second incision 5n, are stacked in a form stacked with the prepreg cut material 48 as an upper layer, can be exemplified.

Further, the second incision can have at least one divergent point. This makes it possible to make the second incision more appropriately follow the outline of the prepreg cut material and to make the second incision exist in a more appropriate region, and a greater effect can be expected by providing the second incision.

Figure 5B:
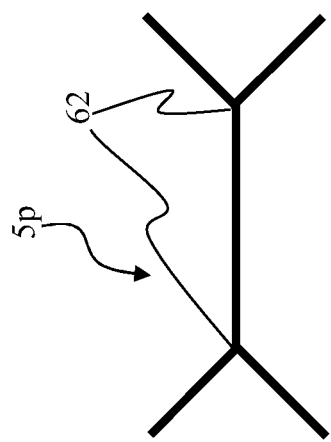
FIGS. 5(a)-5(d) show schematic plan views of second incisions each illustrating an example of a shape of a second incision having a divergent point.
Figure 5D:
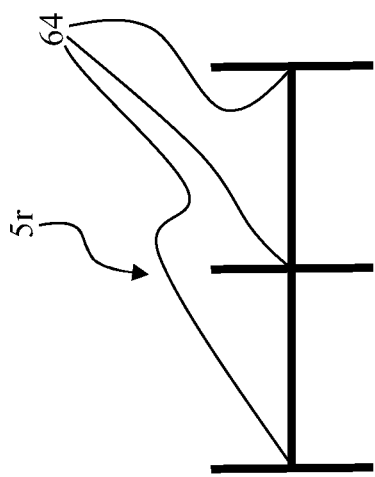
Figure 5A:
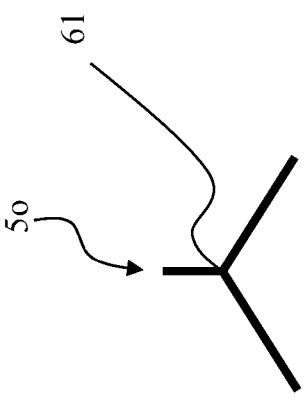
Figure 5C:
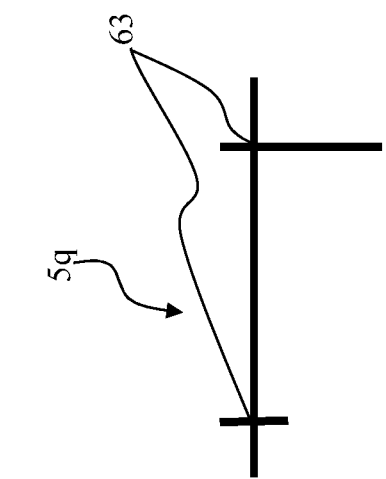

As the shape of the whole second incision when the second incision has at least one divergent point, for example, as shown in FIG. 5 as an example of the planar shape of the second incision, can be exemplified a second incision 5o diverged radially in three directions at a divergent point 61 (FIG. 5(a)), a second incision 5p diverged in two directions at each branch point 62 at each end (FIG. 5(b)), a second incision 5q diverged at respective divergent points 63 so that incisions having different lengths intersect in orthogonal directions (FIG. 5(c)), a second incision 5r diverged at respective divergent points 64 so that incisions having the same length intersect in orthogonal directions (FIG. 5(d)) and the like.

When the second incision has at least one divergent point as described above, it is preferred that any of divergent angles at each divergent point is 180 degrees or less. For example, in a second incision 5s exemplified in FIG. 6(a), any of divergent angles at each divergent point 65, 66 is 180 degrees or less, and it is a preferable example. On the other hand, in a second incision 5t exemplified in FIG. 6(b), because one divergent angle at each of divergent points 67, 68 exceeds 180 degrees, it is an unfavorable example. By opening a larger area with an incision of a short incision length, it is possible to obtain a good deformability while exhibiting good mechanical properties. Namely, when the divergent angle is 180 degrees or less, the triangular region surrounded by the two incisions forming this divergent angle can be deformed in the out-of-plane direction. On the other hand, when the divergent angle exceeds 180 degrees, because the similar region cannot be deformed out of the plane, the area that can be opened via the second incision decreases.

Our preforms are suitable for molding a molded article having a thin wall portion and a thick wall portion, and also effective for when the second incision is arranged at a position of the preform corresponding to the thick wall portion of the molded article and, for example, it is possible to eliminate stretching of fibers at the end of a thick wall portion such as a rib.

In a preform used for molding a molded article having a thin wall portion and a thick wall portion, by providing the second incision in a region of the preform corresponding to the thin wall portion of the molded article, it is possible to eliminate the stretching of fibers occurring in the thin wall portion. Further, when a large thickness change of a preform is required in the thin wall portion, it was not possible to obtain a desired thickness in the conventional technology because the preform cannot be pushed sufficiently, but by providing the second incision in the thin wall portion, the second incision is opened, and because the excess material flows to the thick wall portion, a molded article having a desired thickness can be obtained. When the second incision is provided in the thin wall portion surrounded by the thick wall portion, the length of the second incision is preferably ½ or more of the length of the outer circumference of the thin wall portion.

Further, the second incision can be provided at least in a region of the preform corresponding to a boundary between the thin wall portion and the thick wall portion of the molded article. By having the second incision in the region of the preform corresponding to the boundary between the thin wall portion and the thick wall portion of the molded article, occurrence of the region having a high fiber volume content (high Vf) generated on the thin wall portion side of the boundary between the thin wall portion and the thick wall portion can be avoided. Namely, when the material is pulled into the thick wall portion, there may be a situation where the fibers are stretched at the boundary portion due to the difference in peripheral length between the portion having the thick wall portion and the portion other than the thick wall portion, and the high Vf region is created by the fibers collected from the surroundings due to the pulling. By this, there is a possibility that the mold cannot be completely closed to a desired thickness, or that cracks occur in the high Vf portion. By providing the second incision in this region, the stretching of the fibers is eliminated, the collected fibers are easily drawn into the thick wall portion, the region of high Vf is eliminated, and the mold can be closed to the desired thickness.

Further, when the stacked body is filled into the thick wall portion, usually, the stacked body is filled to be bent in the out-of-plane direction with elongation of the material and slipping between layers. However, if both ends of the thick wall portion are restrained, the deformation of the stacked body in the out-of-plane direction is suppressed. In particular, when both ends of the thick wall portion are thin wall portions, this restraint is likely to occur. By having the second incision in the region of the preform corresponding to the thick wall portion of the molded article, because the incision becomes the flow end, the material can be filled in the thick wall portion without accompanying with deformation in the out-of-plane direction.

In addition, since the material is filled in the thick wall portion part through the incision becoming the flow end, by providing the second incision along the thick wall portion, the distance from the incision to the end of the thick wall portion (product surface) is reduced, and the filling becomes easy.

Further, it is preferred that the length L2 of the second incision satisfies equation (a):

$$L2 \geq 2t/\cos \theta \qquad (a)$$

wherein t: height of the thick wall portion, θ: angle formed between a principal axis direction of the thick wall portion and a fiber direction of a surface layer of the preform.

Namely, when the stretching of fibers is eliminated and the material is pulled into the thick wall portion, the fibers corresponding to the surface area of the thick wall portion are pulled. When the surface of the thick wall portion is developed in a plane, since the length in the direction orthogonal to the longitudinal direction is (2t+the width of the thick wall portion), from the viewpoint preventing the fibers contained in at least a zone of 2t or more from stretching, the length of the above-described equation (a) is required. The fiber stretching is greatly affected by the fiber direction of the surface layer.

Further, when the second incision extends along the extending direction of the thick wall portion, it is also preferred that the length L2 of the second incision is equal to a length in a principal axis direction of the thick wall portion or more. Since the thick wall portion is filled through the incision becoming the flow end, the longer the length of the second incision is, the larger the flow end becomes, and by making the length of the second incision equal to the length of the thick wall portion or more, the flow end is formed over the entire region directly below the thick wall portion, and the filling is improved.

Furthermore, the influence of the fibers on the surface layer is large on the stretching of fibers, and the effect of cutting the fibers is great for eliminating or reducing the stretching of fibers. Therefore, to efficiently cut the fibers with a shorter incision, it is also preferred that the angle formed between the second incision and a fiber direction of a surface layer of the preform forming the thick wall portion is in a range of 90 degrees±15 degrees.

As a method of producing a preform, any of the following methods can be employed. (I) a method comprising the following steps of: (a) a step of forming a plurality of prepreg cut materials each of which is made by cutting a sheet-like prepreg into an outline of a predetermined shape, the sheet-like prepreg comprising reinforcing fibers aligned in one direction and a matrix resin, (b) a step of stacking the plurality of prepreg cut materials in a form of a preform, and (c) a step of providing, to at least one prepreg cut material among the plurality of prepreg cut materials, in addition to first incisions that have been regularly provided throughout the whole in-plane region, a second incision that is longer than the first incision only in a predetermined specific region, wherein the step (c) is carried out between the step (a) and the step (b) or before the step (a), or (II) a method comprising the following steps of: (a) a step of forming a plurality of prepreg cut materials each of which is made by cutting a sheet-like prepreg into an outline of a predetermined shape, the sheet-like prepreg comprising reinforcing fibers aligned in one direction and a matrix resin, (b) a step of stacking the plurality of prepreg cut materials in a form of a preform, and (c) a step of providing, to at least one prepreg cut material among the plurality of prepreg cut materials, in addition to first incisions that have been regularly provided throughout the whole in-plane region, a second incision that is longer than the first incision only in a predetermined specific region, wherein the step (c) is carried out after the step (b). Namely, a targeted second incision may be provided before stacking a plurality of prepreg cut materials in a form of a preform or may be provided after the stacking.

In these methods of producing the preform, similarly to the aforementioned forms of the preform, a preform to be produced can comprise, in addition to the prepreg cut material having the first incisions and the second incision, at least one prepreg cut material selected from (A) to (C):

(A) a prepreg cut material having only the first incisions
(B) a prepreg cut material having only the second incision
(C) a prepreg cut material having no incisions.

The above-described production methods (I) and (II) will be exemplified.

For example, as exemplified in FIG. 7 with respect to the production method (I), a prepreg cut material 71 having first incisions 4, a prepreg cut material 72 having first incisions 4 in a different direction, a prepreg cut material 73 having no incisions, and a prepreg cut material 74 having reinforcing fibers 2 in a different direction and having no incisions, are made (FIG. 7(a)), the prepreg cut material 71 is provided with a second incision 5u and the prepreg cut material 73 is provided with a second incision 5v having substantially the same shape (FIG. 7(b)), and by stacking these prepreg cut material 71 having two kinds of the first and second incisions, prepreg cut material 72 having only the first incisions, prepreg cut material 73 having only the second incision, and prepreg cut material 74 having no incisions, a preform 81 can be configured (FIG. 7(c)).

Figure 8A:
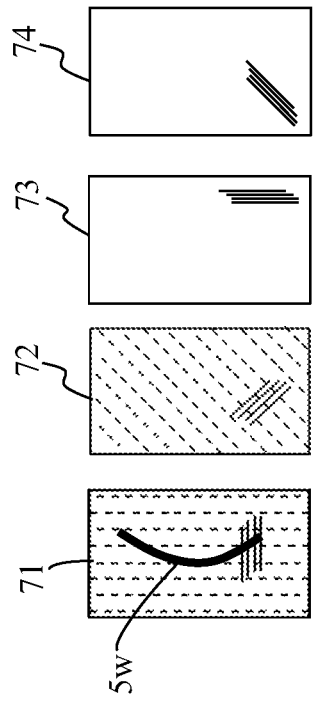
FIGS. 8(a)-8(d) show schematic process diagrams showing another example of a timing at which a second incision is provided and examples of stacking into preforms.
Figure 8B:
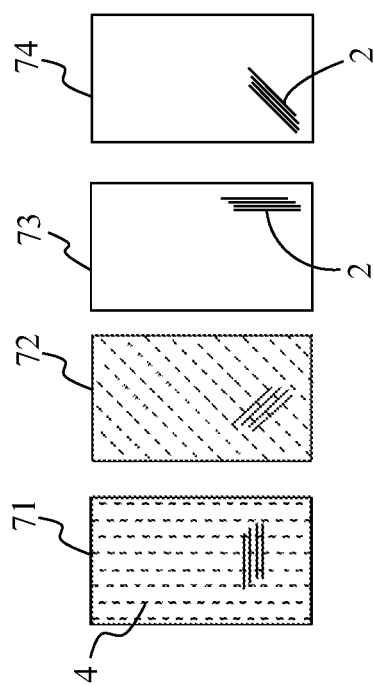
Figure 8C:
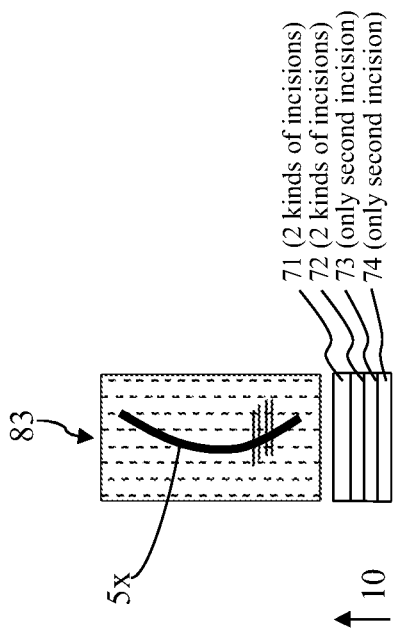
Figure 8D:
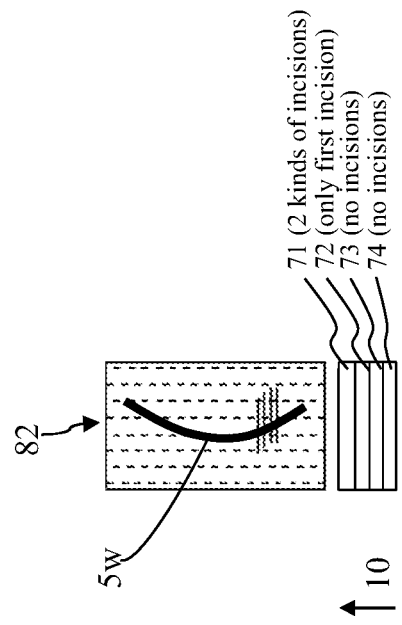

Further, as exemplified in FIG. 8 with respect to the production method (II), a prepreg cut material 71 having first incisions 4, a prepreg cut material 72 having first incisions 4 in a different direction, a prepreg cut material 73 having no incisions, and a prepreg cut material 74 having reinforcing fibers 2 in a different direction and having no incisions, are made (FIG. 8(a)), a second incision 5w is provided in the prepreg cut material 71 as needed (FIG. 8(b)) (in this example, there is a possibility that the second incision 5w is not provided and the step of FIG. 8(b) is omitted.), and by stacking these prepreg cut material 71 having two kinds of the first and second incisions, prepreg cut material 72 having only the first incisions, prepreg cut material 73 having no incisions, and prepreg cut material 74 having no incisions, a preform 82 as a precursor of a finally targeted preform is made (FIG. 8(c)), and with respect to the preform 82 as a precursor, a second incision 5x is cut and inserted following the second incision 5w of one prepreg cut material 71 which appears on the surface to penetrate the preform over the entire thickness direction of the preform, to configure a finally targeted preform 83 (FIG. 8(d)). This finally formed preform 83 has a stacking structure of a prepreg cut material 71 having two kinds of the first and second incisions, a prepreg cut material 72 having two kinds of the first and second incisions, a prepreg cut material 73 having only the second incision, and a prepreg cut material 74 having only the second incision.

Thus, with respect to the second incision to be finally formed, the shape, depth and the like, as well as the timing of providing can be freely set in accordance with the form of the finally molded article.

EXAMPLES

Hereinafter, examples of our preforms, in particular, examples of the preforms used for molding a molded article having a thin wall portion and a thick wall portion, will be explained with reference to the drawings.

Example 1

Figure 9:
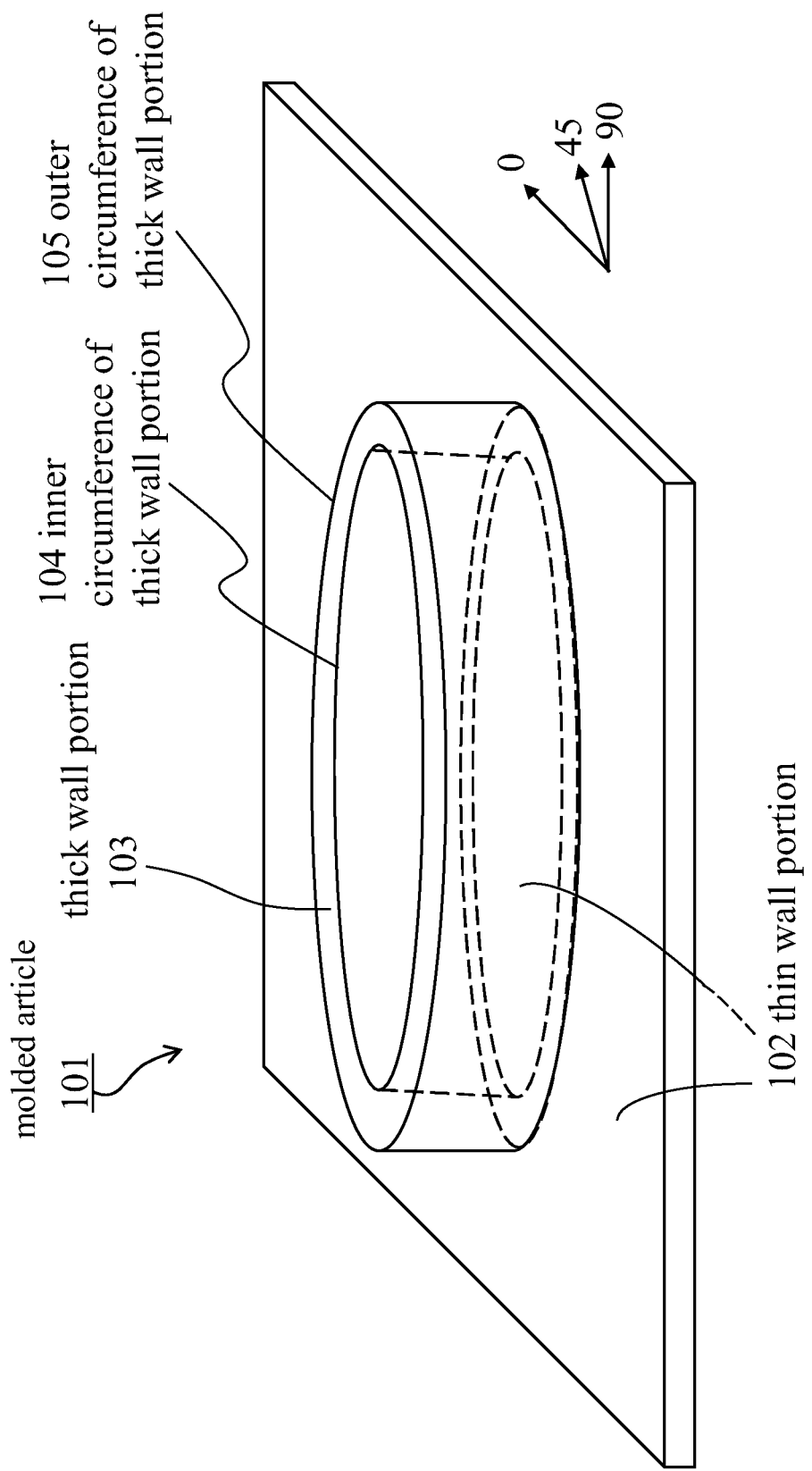
FIG. 9 is a perspective view of a molded article in Example 1.
Figure 10:
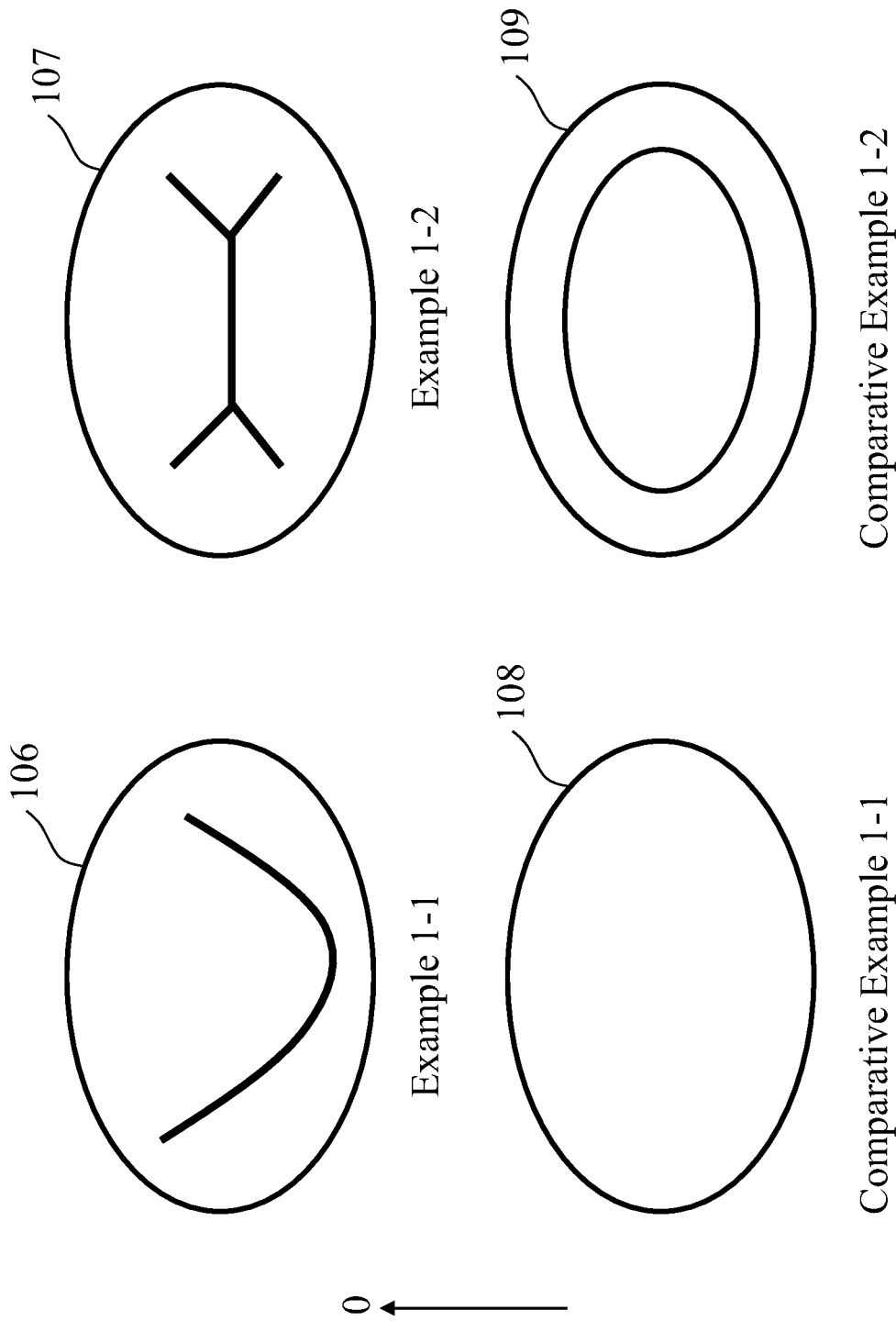
FIG. 10 shows plan views of prepreg cut materials used in Example 1.

A molded article 101 having a shape shown in FIG. 9 was press-molded using a double-sided mold having a cavity in the shape of a molded article. In the molded article 101, a cylindrical thick wall portion 103 is integrally molded on a flat plate-shaped thin wall portion 102. Symbol 104 indicates the inner circumference of the thick wall portion, and symbol 105 indicates the outer circumference of the thick wall portion. Numerals 0, 45 and 90 in FIG. 9 represent the orientation angle directions (unit: degree) of the reinforcing fibers in the prepregs stacked in the preform preparation stage. With respect to the molded article 101 having such a shape, FIG. 10 shows the planar shapes of the prepreg cut materials for forming the preform region corresponding to the thick wall portion 103 of the molded article 101 and the shapes when the second incisions are provided. A prepreg cut material 106 in Example 1-1, a prepreg cut material 107 in Example 1-2, a prepreg cut material 108 in Comparative Example 1-1 and a prepreg cut material 109 in Comparative Example 1-2 were used, respectively, and a predetermined number of the respective prepreg cut materials were stacked to form a region of a preform before press molding corresponding to the wall thick portion 103.

The prepreg used was "TORAYCA" (registered trademark) prepreg sheet P3252S-20 (yarn areal weight: 200 gsm, resin content: 33%, prepreg areal weight: 299 gsm, thickness: 0.19 mm), and the carbon fiber of the prepreg was T700SC (density: 1.80, tensile strength: 500 kgf/mm$^2$, tensile elastic modulus: 23.5 tf/mm$^2$) and the resin was #2592 (epoxy, 130° C. curing type). Further, first incisions were inserted over the whole region of this prepreg, and it was used as an incision prepreg in Examples 1-1 and 1-2 and Comparative Example 1-1. In Comparative Example 1-2, a prepreg in which the first incisions were not inserted was used.

The ply number of the preform of the thick wall portion, that is, the number of stacked layers (for example, 16 ply) was set to a value obtained by dividing the volume of the thick wall portion by the area of the prepreg cut material and the thickness of one prepreg.

The material yield is a value obtained by dividing the total area of the prepreg cut materials used for the preform by the area of the prepreg sheet before cutting out the prepreg cut materials.

The resin rich or resin-rich part is a region of only resin having a fiber volume content Vf smaller than that of a healthy part or containing no fibers. If there is a resin rich, the color of the resin causes yellowing or whitening which deteriorates the appearance, and the mechanical properties also reduce. In addition to those generated on the surface of the molded article, those confirmed by cross-sectional observation were also added to the evaluation.

Further, the thin wall portion 102 in the central portion of the molded article 101 shown in FIG. 9 was detected in flaw using an ultrasonic flaw detector, and the height of the bottom echo was measured. The measurement points were three points of the center of the thin wall portion, the middle point between the center of the thin wall portion and the right end of the thin wall portion and the middle point between the center of the thin wall portion and the left end of the thin wall portion, and an average value of these was shown in Table 1. If there are "flaws" such as voids and peelings inside the molded article, the value of the height of bottom echo becomes small. Further, the height of bottom echo becomes 0 when a large "flaw" is present. It was adjusted so that the height of bottom echo of a molded article with the same thickness as the thin wall portion having no "flaw" became 100%, and the height of bottom echo of 80% or more was determined to be acceptable.

The molded article 101 was cut at the center in the direction of 90 degrees, and the cross section was observed after resin filling and polishing to evaluate the presence or absence of voids.

Example 1-1

The length of the second incision of the prepreg cut material 106 shown in FIG. 10 was/set to become ½ of the length of the inner circumference of the thick wall portion of the molded article. The prepreg cut material inserted with the second incision was cut using an automatic cutting machine, and 16 plies of [(0/90)s/(45/−45)s]s were stacked to prepare a preform of a thick wall portion (the above-described numerical values represent the orientation direction of the reinforcing fibers with respect to the fiber orientation directions shown in FIG. 9.). The second incision of the preform of the thick wall portion penetrated in the preform thickness direction. Subsequently, 8 plies of [0/90/45/−45]s were stacked to prepare a preform of a thin wall portion. No second incision was inserted in the thin wall portion. Furthermore, the preform of the thick wall portion and the preform of the thin wall portion were overlapped and integrated. The material yield of the preform of the thick wall portion was 43%. Then, the integrated preform was press molded using a double-sided mold having a cavity with a molded article shape. The obtained molded article had no resin richness or voids, and the value of the height of bottom echo was also good.

Example 1-2

The end of the second incision was set to reach the boundary between the thin wall portion and thick wall portion. An integrated preform was prepared in the same manner as in Example 1, and press molded in the same manner as in Example 1. The obtained molded article was as good as in Example 1.

Figure 11:
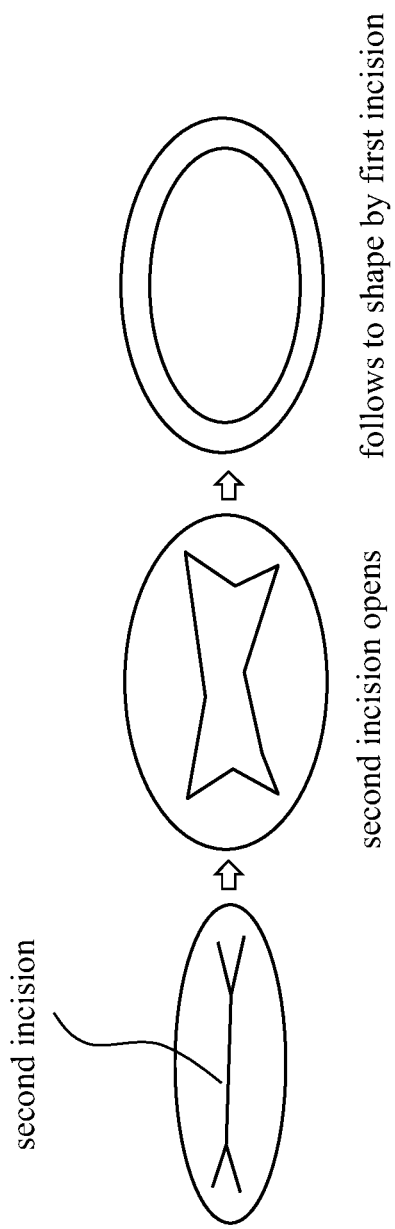
FIG. 11 is a schematic plan view showing a state in which a thick wall portion is formed in Example 1-1.

In the above-described Examples, as shown in FIG. 11 as an example of how the thick wall portion in Example 1-2 was formed, first the second incision was opened to suppress the stretching of the fibers, and further, by the condition where the material followed up to the end of the molded article shape by the first incisions, a molded article having a good quality was obtained.

Comparative Example 1-1

An integrated preform was prepared in the same manner as in Example 1-1 other than a condition where the second incision was not inserted. Although resin richness did not occur on the surface of the molded article, resin richness was confirmed inside the thick wall portion as the result of cross-sectional observation. Further, a plurality of voids with a size of several hundred μm were confirmed by cross-sectional observation, and the value of the height of bottom echo in the ultrasonic flaw detection was also small, and an inferior internal quality was resulted.

Comparative Example 1-2

A prepreg having no first incisions was used. A prepreg cut material having a cylindrical shape that matches the cross-sectional shape of the thick wall portion was cut by an automatic cutting machine, and 24 plies of [(0/90)s/(45/−45)s/(0/90)s]s were stacked to prepare a preform of a thick wall portion. Further, a preform of the thin wall portion was prepared in the same manner as in Example 1-1, integrated with the preform of the thick wall portion, and the integrated preform was press molded using a double-sided mold with a cavity having the shape of a molded article. Although the quality of the obtained molded article was good, the material yield of the preform of the thick wall portion was reduced to 36% by the occurrence of loss due to the hollowing out of the center part. Furthermore, since the number of stacked sheets increased by 1.5 times, it took time for the stacking work.

Table 1 summarizes the results of evaluating the moldability of the preform using each prepreg cut material shown in FIG. 10.

TABLE 1

|  | First incision | Second incision | Number of stacked pieces | Material yield (thick wall portion) | Resin rich | Height of bottom echo | Voids |
| --- | --- | --- | --- | --- | --- | --- | --- |
| Example 1-1 | present | present | 16 | 43% | none | 98% | none |
| Example 1-2 | present | present | 16 | 43% | none | 100% | none |
| Comparative Example 1-1 | present | none | 16 | 43% | present | 54% | present |

TABLE 1-continued

|  | First incision | Second incision | Number of stacked pieces | Material yield (thick wall portion) | Resin rich | Height of bottom echo | Voids |
|---|---|---|---|---|---|---|---|
| Comparative Example 1-2 | none | none | 24 | 36% | none | 100% | none |

Example 2

Figure 12:
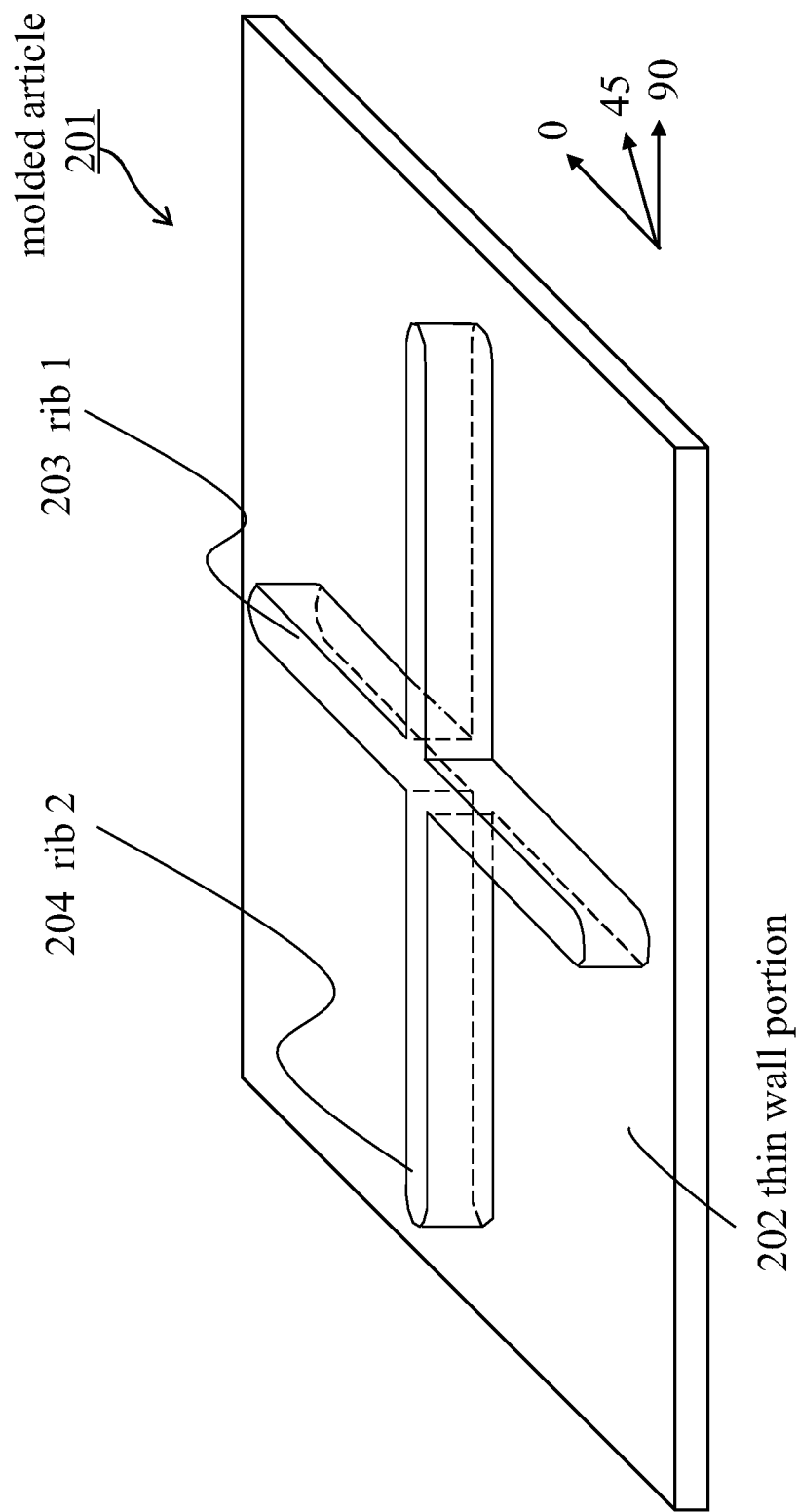
FIG. 12 is a perspective view of a molded article in Example 2.
Figure 13:
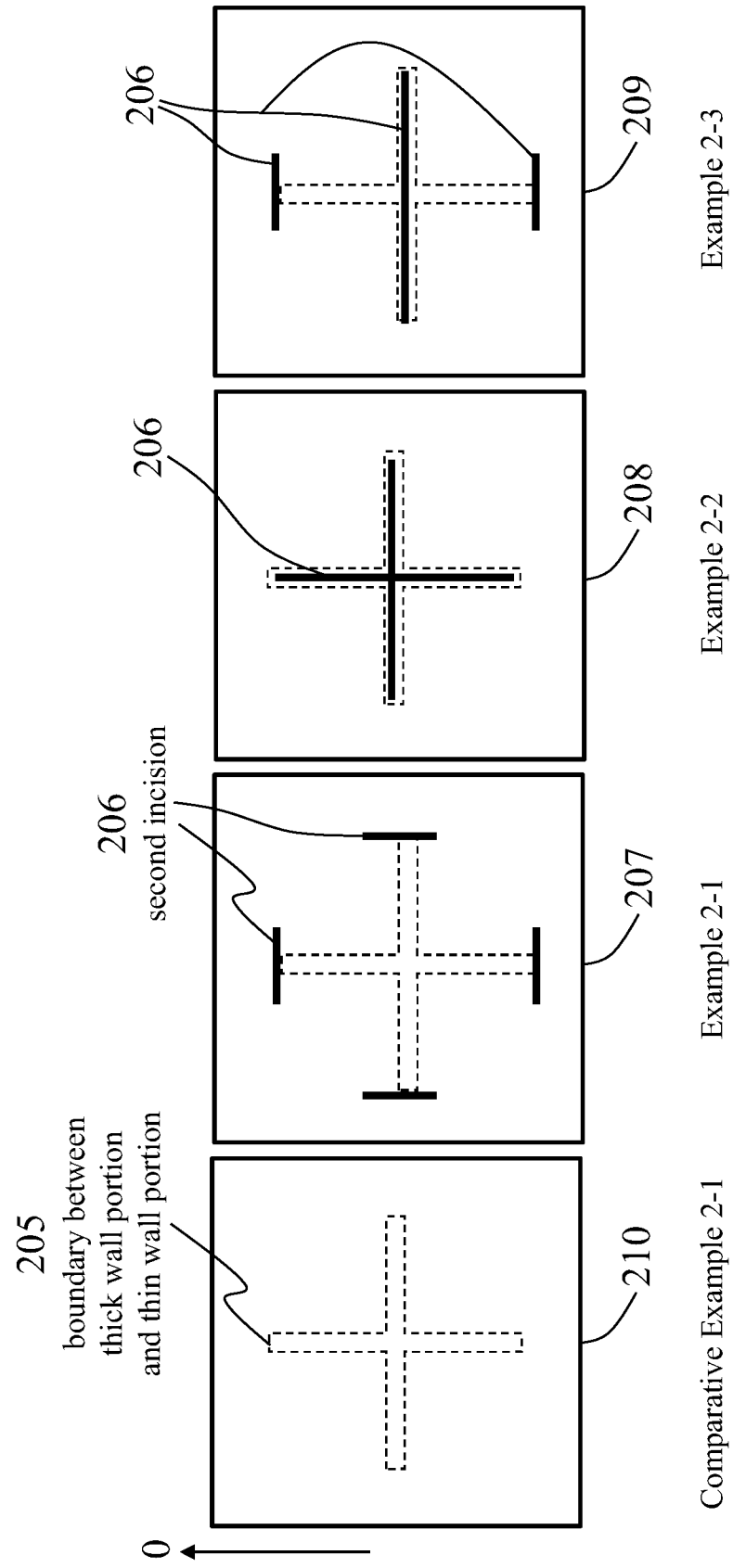
FIG. 13 shows plan views of prepreg cut materials used in Example 2.

A molded article 201 having a shape shown in FIG. 12 was press molded using a double-sided mold with a cavity having a shape of the molded article. In the molded article 201, a rib 1 (203) and a rib 2 (204) intersecting in a cross shape as a thick wall portion are integrally molded on a flat plate-shaped thin wall portion 202. Symbols 0, 45 and 90 in FIG. 12 represent the orientation angle directions (unit: degree) of the reinforcing fibers in the prepregs stacked in the preform preparation stage. Symbol 205 indicates the boundary between the thick wall portion and the thin wall portion, and symbol 206 indicates a second incision. With respect to the molded article 201 having such a shape, FIG. 13 shows planar shapes of prepreg cut materials having preform regions corresponding to the thick wall portions (portions of ribs 203 and 204) in addition to the thin wall portion 202 of the molded article 201 and the shapes of second incisions when the second incisions are provided. Using a prepreg cut material 207 in Example 2-1, a prepreg cut material 208 in Example 2-2, a prepreg cut material 209 in Example 2-3 and a prepreg cut material 210 in Comparative Example 2-1, respectively, a predetermined number of the respective prepreg cut materials were stacked and press molded using a double-sided mold with a cavity having the shape of a molded article, to mold a molded article having the shape as shown in FIG. 12. As to Example 2, both the Comparative Example and the Example used an incision prepreg having the first incisions. Further, the longitudinal direction of the rib 1 is the 0 degree direction, and the longitudinal direction of the rib 2 is the 90 degree direction. Table 2 summarizes the results of evaluating the moldability of the preform using each prepreg cut material shown in FIG. 13.

The same prepreg as in Example 1 was used as the material. The reachable height of the rib is the (partially) maximum reachable height in each rib when the height of the rib fully filled is referred to as 100%. It becomes 0% when it is not filled at all. It was measured using a ruler.

The filling rate of the rib is a filling amount in each rib when the volume of the rib fully filled is referred to as 100%. It becomes 0% when it is not filled at all. The size of the unfilled portion was measured using a ruler to calculate the volume of the unfilled portion, and the filling rate was calculated by subtracting the volume of the unfilled portion from the volume of the rib fully filled.

Resin richness was determined by appearance inspection, and the existing one was determined as Y and the non-existing one was determined as N.

Comparative Example 2-1

A preform was prepared by stacking 6 plies of [0/90/0]s prepreg cut materials each having no second incisions. Then, it was press molded using a double-sided mold with a cavity having a shape of a molded article. The maximum reachable height was 70%, the filling rate was 50% or less, and resin richness also occurred.

Example 2-1

After preparing a preform similar to that in Comparative Example 2-1, a second incision was inserted using a cutter knife so that it penetrated the preform at a position just below the boundary between the thick wall portion and the thin wall portion. In the rib 1, the filling height reached 100%, the filling rate was improved by 45 points, and resin richness did not occur. On the other hand, the rib 2 showed only a slight improvement in the filling rate.

Effect Due to Incision in Example 2-1

It is that the stretching of fibers occurred at the boundary between thick wall portion and the thin wall portion was alleviated, and this is effect is highly effective on the rib extending in the 0 degree direction. If the fibers are stretched, a region of high Vf is generated at that location and the mold cannot be pushed completely, and therefore, the molded article cannot have a desired thickness. If the mold can be pushed completely, the thin wall portion has a desired thickness, and the change in thickness at that time fills the thick wall portion to uniformly achieve a targeted Vf.

Example 2-2

After preparing a preform similar to that in Comparative Example 2-1, a second incision was inserted using a cutter knife so that it penetrated the preform at a position just below the thick wall portion. The filling heights at ribs 1 and 2 reached 100%, the filling rate was also improved, and resin richness did not occur.

Effect Due to Incision in Example 2-2

It is that the flow end was formed just below the rib, and this is highly effective on the rib extending in the 90 degree direction. When the rib is filled with the stacked body, it is necessary to fill the rib accompanying with deformation in that the stacked body bends in the out-of-plane direction, but when the second incision is present directly below the thick wall portion, it becomes possible that the rib is filled only by the in-plane flow.

Example 2-3

A prepreg cut material having a second incision was cut using an automatic cutting machine and 6 plies of [0/90/0]s were stacked to prepare a preform. The second incision penetrated through the preform in the thickness direction of the preform. The rib 1 was completely filled and resin richness also did not occur. The rib 2 also showed an improvement similarly to in Example 2-2.

FIG. 14 shows the results of visually observing the degree of achievement of filling to the ribs 1 and 2 in each of the Examples and Comparative Examples.

TABLE 2

|  | Rib 1 | | | Rib 2 | | |
| --- | --- | --- | --- | --- | --- | --- |
|  | Reachable height | Filling rate | Resin rich | Reachable height | Filling rate | Resin rich |
| Comparative Example 2-1 | 70% | 50% | Y | 60% | 30% | Y |
| Example 2-1 | 100% | 95% | N | 60% | 60% | Y |
| Example 2-2 | 100% | 90% | N | 100% | 80% | N |
| Example 2-3 | 100% | 100% | N | 100% | 75% | N |

INDUSTRIAL APPLICABILITY

Our preforms and the methods of producing the same can be applied to the production of any fiber-reinforced resin molded article, and are particularly suitable for the production of molded articles having a thickness change or a complicated three-dimensional shape.

The invention claimed is:

1. A preform prepared by stacking two or more prepreg cut materials each of which is made by cutting a sheet-like prepreg into an outline of a predetermined shape, the sheet-like prepreg comprising reinforcing fibers aligned in one direction and a matrix resin, wherein at least one prepreg cut material has first incisions regularly distributed throughout the whole in-plane region and a second incision provided only in a predetermined specific region and longer than the first incision, wherein the second incision has at least one divergent point.

2. The preform according to claim 1, wherein the number of the second incisions in said at least one prepreg cut material is ½0 or less of the number of the first incisions.

3. The preform according to claim 1, wherein the second incision extends, as a whole, along an outline of said at least one prepreg cut material.

4. The preform according to claim 1, wherein the preform comprises a prepreg cut material having the first incisions and the second incision and at least one prepreg cut material selected from (A) to (C):
    (A) prepreg cut material having only the first incisions
    (B) prepreg cut material having only the second incision
    (C) prepreg cut material having no incisions.

5. The preform according to claim 1, wherein the second incision does not reach up to an outline of said at least one prepreg cut material.

6. The preform according to claim 1, wherein a plurality of prepreg cut materials each having the second incision are provided, and a total depth of the second incisions of the plurality of prepreg cut materials is 50% or more of a thickness of the preform.

7. The preform according to claim 1, wherein the second incision penetrates through the preform.

8. The preform according to claim 1, wherein any of divergent angles at the divergent point of the second incision is 180 degrees or less.

9. The preform according to claim 1, wherein said at least one prepreg cut material has a three-dimensional shape portion protruding in an out-of-plane direction.

10. The preform according to claim 1, wherein the preform is a preform used for molding a molded article having a thin wall portion and a thick wall portion.

11. The preform according to claim 10, wherein the second incision is provided at least in a region of the preform corresponding to the thin wall portion of the molded article.

12. The preform according to claim 10, wherein the second incision is provided at least in a region of the preform corresponding to a boundary between the thin wall portion and the thick wall portion of the molded article.

13. The preform according to claim 10, wherein the second incision is provided at least in a region of the preform corresponding to the thick wall portion of the molded article.

14. The preform according to claim 10, wherein the second incision extends along a direction in which the thick wall portion extends.

15. The preform according to claim 14, wherein a length L2 of the second incision is equal to a length in a principal axis direction of the thick wall portion or more.

16. The preform according to claim 10, wherein a length L2 of the second incision satisfies equation (a):

$$L2 \geq 2t/\cos\theta \quad (a)$$

wherein t: height of the thick wall portion, θ angle formed between a principal axis direction of the thick wall portion and a fiber direction of a surface layer of the preform.

17. The preform according to claim 10, wherein an angle formed between the second incision and a fiber direction of a surface layer of the preform forming the thick wall portion is in a range of 90 degrees ±15 degrees.

18. A method of producing a preform comprising:
    (a) forming a plurality of prepreg cut materials each of which is made by cutting a sheet-like prepreg into an outline of a predetermined shape, the sheet-like prepreg comprising reinforcing fibers aligned in one direction and a matrix resin,
    (b) stacking the plurality of prepreg cut materials in a form of a preform, and
    (c) providing, to at least one prepreg cut material among the plurality of prepreg cut materials, in addition to first incisions that have been regularly provided throughout the whole in-plane region, a second incision that is longer than the first incision only in a predetermined specific region, wherein the second incision has at least one divergent point, wherein (c) is carried out between (a) and (b) or before (a).

19. The method according to claim 18, wherein a preform to be produced comprises, in addition to the prepreg cut material having the first incisions and the second incision, at least one prepreg cut material selected from (A) to (C):
    (A) a prepreg cut material having only the first incisions
    (B) a prepreg cut material having only the second incision
    (C) a prepreg cut material having no incisions.

20. A method of producing a preform comprising:
    (a) forming a plurality of prepreg cut materials each of which is made by cutting a sheet-like prepreg into an outline of a predetermined shape, the sheet-like prepreg comprising reinforcing fibers aligned in one direction and a matrix resin,
    (b) stacking the plurality of prepreg cut materials in a form of a preform, and
    (c) providing, to at least one prepreg cut material among the plurality of prepreg cut materials, in addition to first incisions that have been regularly provided throughout the whole in-plane region, a second incision that is longer than the first incision only in a predetermined specific region, wherein the second incision has at least one divergent point, wherein (c) is carried out after (b).

* * * * *